US012591999B2

(12) United States Patent
Wantz et al.

(10) Patent No.: US 12,591,999 B2
(45) Date of Patent: Mar. 31, 2026

(54) SYSTEM, APPARATUS, AND METHOD FOR CONTINUOUS DIGITAL IMAGE CALIBRATION

(71) Applicant: SCHLUMBERGER TECHNOLOGY CORPORATION, Sugar Land, TX (US)

(72) Inventors: François Wantz, Clamart (FR); Mahdi Ammar, Dammam (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 19/141,073

(22) PCT Filed: May 24, 2024

(86) PCT No.: PCT/US2024/030964
§ 371 (c)(1),
(2) Date: Jun. 19, 2025

(87) PCT Pub. No.: WO2024/249294
PCT Pub. Date: Dec. 5, 2024

(65) Prior Publication Data
US 2026/0044984 A1 Feb. 12, 2026

(30) Foreign Application Priority Data

May 26, 2023 (EP) ..................................... 23305837

(51) Int. Cl.
G06T 7/80 (2017.01)
G06V 10/56 (2022.01)
(Continued)

(52) U.S. Cl.
CPC ................ G06T 7/80 (2017.01); G06V 10/56 (2022.01); H04N 23/555 (2023.01); H04N 23/64 (2023.01); G06T 2207/10024 (2013.01)

(58) Field of Classification Search
CPC . G06T 7/80; G06T 2207/10024; G06V 10/56; H04N 23/555; H04N 23/64
See application file for complete search history.

(56) References Cited

U.S. PATENT DOCUMENTS 6,259,486 B1 * 7/2001 Mahvi ...................... H04N 5/44
348/730
6,287,199 B1 * 9/2001 McKeown ......... H04N 7/17318
348/E7.071

(Continued)

FOREIGN PATENT DOCUMENTS

CN 114494723 A 5/2022
WO 2017196885 A1 11/2017
WO 2022032057 A1 2/2022

OTHER PUBLICATIONS

International Search Report and Written Opinion of International Patent Application No. PCT/US2024/030964 dated on Sep. 11, 2024, 09 pages.

*Primary Examiner* — Michael B. Pierorazio
(74) *Attorney, Agent, or Firm* — Dayo Aladeniyi

(57) ABSTRACT

A system includes a digital camera deployed in an image acquisition chamber and configured to acquire a digital image of a cuttings sample. A calibration sample holder including a sample area configured to receive the drill cuttings sample and a calibration area having a color calibration region and a spatial resolution calibration region is deployed in the image acquisition chamber below the digital camera such that both the sample area and the calibration area are within a field of view of the digital camera. An electronic controller is configured to cause the digital cam-
(Continued)

FIG. 3B era to take a digital image of the calibration sample holder and evaluate a portion of the digital image including the calibration area to certify that the digital image meets or exceeds predetermined calibration standards.

20 Claims, 7 Drawing Sheets

(51) Int. Cl.
  *H04N 23/50*      (2023.01)
  *H04N 23/60*      (2023.01)

(56)                References Cited

U.S. PATENT DOCUMENTS

| | | | | |
|---|---|---|---|---|
| 7,120,880 | B1* | 10/2006 | Dryer | G06Q 30/02 |
| | | | | 715/831 |
| 7,246,081 | B2* | 7/2007 | Hill | G06Q 30/0204 |
| | | | | 705/7.32 |
| 7,603,683 | B2* | 10/2009 | Reto | H04N 7/15 |
| | | | | 709/204 |
| 7,730,507 | B2* | 6/2010 | Sakai | H04N 5/63 |
| | | | | 348/730 |
| 7,814,509 | B2* | 10/2010 | Kondo | H04N 21/2143 |
| | | | | 725/12 |
| 7,889,073 | B2* | 2/2011 | Zalewski | G06F 3/012 |
| | | | | 340/500 |
| 8,190,907 | B2* | 5/2012 | Tu | G06F 21/32 |
| | | | | 713/186 |
| 8,249,931 | B2* | 8/2012 | Giraud | G06V 40/165 |
| | | | | 705/14.5 |
| 8,504,843 | B2* | 8/2013 | Tu | A63F 13/212 |
| | | | | 713/186 |
| 8,689,250 | B2* | 4/2014 | Bhide | H04N 21/6582 |
| | | | | 725/40 |
| 8,712,110 | B2* | 4/2014 | Eckhoff | G06V 40/16 |
| | | | | 345/1.3 |
| 8,819,738 | B2* | 8/2014 | Gresta | H04N 21/816 |
| | | | | 725/61 |
| 9,785,247 | B1* | 10/2017 | Horowitz | G06V 40/113 |
| 10,217,281 | B2* | 2/2019 | Yu | G06T 7/251 |
| 12,394,072 | B1* | 8/2025 | Spiteri | G09B 19/0038 |
| 12,412,299 | B2* | 9/2025 | Yamaguchi | A61B 5/107 |
| 12,455,439 | B2* | 10/2025 | Ammar | G02B 21/06 |
| 2003/0063222 | A1* | 4/2003 | Creed | H04N 21/4508 |
| | | | | 348/E5.122 |
| 2005/0091680 | A1* | 4/2005 | Kondo | H04N 21/8146 |
| | | | | 725/12 |
| 2005/0262542 | A1* | 11/2005 | DeWeese | H04N 21/454 |
| | | | | 348/E7.071 |
| 2006/0143647 | A1* | 6/2006 | Bill | G06F 16/636 |
| | | | | 707/E17.101 |
| 2006/0177109 | A1* | 8/2006 | Storch | A63F 1/00 |
| | | | | 382/118 |
| 2007/0110298 | A1* | 5/2007 | Graepel | G06V 40/28 |
| | | | | 345/619 |
| 2007/0150916 | A1* | 6/2007 | Begole | H04N 21/42201 |
| | | | | 382/116 |
| 2007/0152994 | A1* | 7/2007 | Koh | G09G 5/006 |
| | | | | 348/E5.127 |
| 2007/0203911 | A1* | 8/2007 | Chiu | G06F 16/78 |
| 2008/0169930 | A1* | 7/2008 | Mallinson | G06Q 30/02 |
| | | | | 340/573.1 |
| 2009/0158309 | A1* | 6/2009 | Moon | G06V 20/53 |
| | | | | 725/12 |
| 2009/0158374 | A1* | 6/2009 | Malaure | H04L 67/10 |
| | | | | 725/114 |
| 2009/0164917 | A1* | 6/2009 | Kelly | G06F 3/011 |
| | | | | 715/757 |
| 2009/0195392 | A1* | 8/2009 | Zalewski | G06F 3/017 |
| | | | | 340/573.1 |
| 2010/0008547 | A1* | 1/2010 | Yagnik | G06F 18/28 |
| | | | | 382/118 |
| 2010/0075749 | A1* | 3/2010 | Seshadri | A63F 13/73 |
| | | | | 463/30 |
| 2010/0299210 | A1* | 11/2010 | Giraud | G06Q 40/165 |
| | | | | 705/14.66 |
| 2010/0304853 | A1* | 12/2010 | Kukita | G07F 17/3227 |
| | | | | 463/30 |
| 2011/0018875 | A1* | 1/2011 | Arahari | G06T 15/04 |
| | | | | 345/420 |
| 2011/0065490 | A1* | 3/2011 | Lutnick | G07F 17/3223 |
| | | | | 463/16 |
| 2011/0275432 | A1* | 11/2011 | Lutnick | G07F 17/3244 |
| | | | | 463/25 |
| 2012/0059845 | A1* | 3/2012 | Covell | H04N 21/4394 |
| | | | | 707/769 |
| 2012/0135799 | A1* | 5/2012 | Okada | G07F 17/3202 |
| | | | | 463/25 |
| 2012/0218266 | A1* | 8/2012 | Maeta | H04N 13/183 |
| | | | | 345/422 |
| 2012/0244939 | A1* | 9/2012 | Braun | A63F 13/213 |
| | | | | 463/31 |
| 2012/0262574 | A1* | 10/2012 | Park | G06F 3/00 |
| | | | | 348/143 |
| 2013/0111509 | A1* | 5/2013 | Guo | H04H 60/45 |
| | | | | 725/12 |
| 2013/0312041 | A1* | 11/2013 | Gresta | H04N 7/17318 |
| | | | | 725/116 |
| 2015/0334380 | A1* | 11/2015 | Kim | H04N 13/327 |
| | | | | 348/54 |
| 2016/0307335 | A1* | 10/2016 | Perry | G06T 7/292 |
| 2017/0091529 | A1* | 3/2017 | Beeler | G06T 7/246 |
| 2019/0206089 | A1* | 7/2019 | Wu | G06T 7/90 |
| 2020/0288050 | A1* | 9/2020 | Knoll | G06T 7/292 |
| 2021/0158590 | A1* | 5/2021 | Bradley | G06T 17/20 |
| 2021/0201502 | A1* | 7/2021 | Hsu | G06V 40/171 |
| 2021/0312621 | A1 | 10/2021 | Chou | |
| 2021/0389240 | A1 | 12/2021 | Labayrade | |
| 2022/0138967 | A1* | 5/2022 | Slocum | G06T 7/215 |
| | | | | 382/103 |
| 2022/0351391 | A1* | 11/2022 | Derakhshani | G06T 7/0002 |
| 2023/0039554 | A1* | 2/2023 | Chen | G06V 10/764 |
| 2023/0186684 | A1* | 6/2023 | Qiu | G06T 7/251 |
| | | | | 382/103 |
| 2024/0123288 | A1* | 4/2024 | Barbalinardo | G06V 10/764 |
| 2024/0144573 | A1* | 5/2024 | Agrawal | G06T 15/00 |
| 2024/0256030 | A1* | 8/2024 | Dahl | G06F 3/012 |
| 2024/0428456 | A1* | 12/2024 | Manzur | G06T 7/75 |
| 2025/0173891 | A1* | 5/2025 | Manzur | G06T 7/70 |

* cited by examiner

45

45

45

300

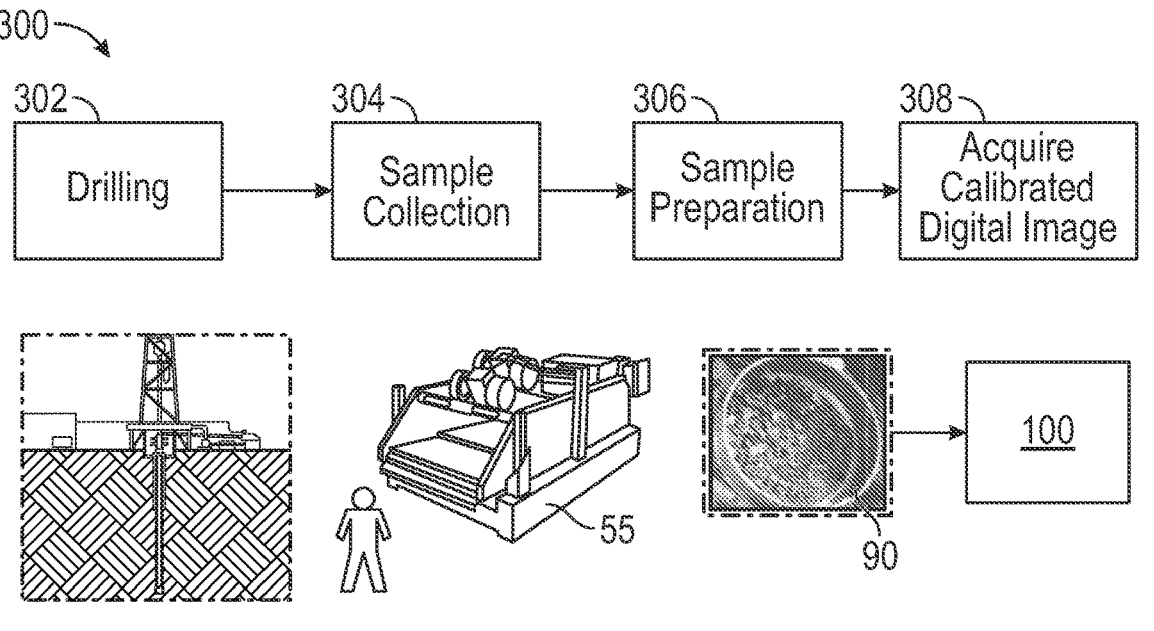

302 — Drilling → 304 — Sample Collection → 306 — Sample Preparation → 308 — Acquire Calibrated Digital Image

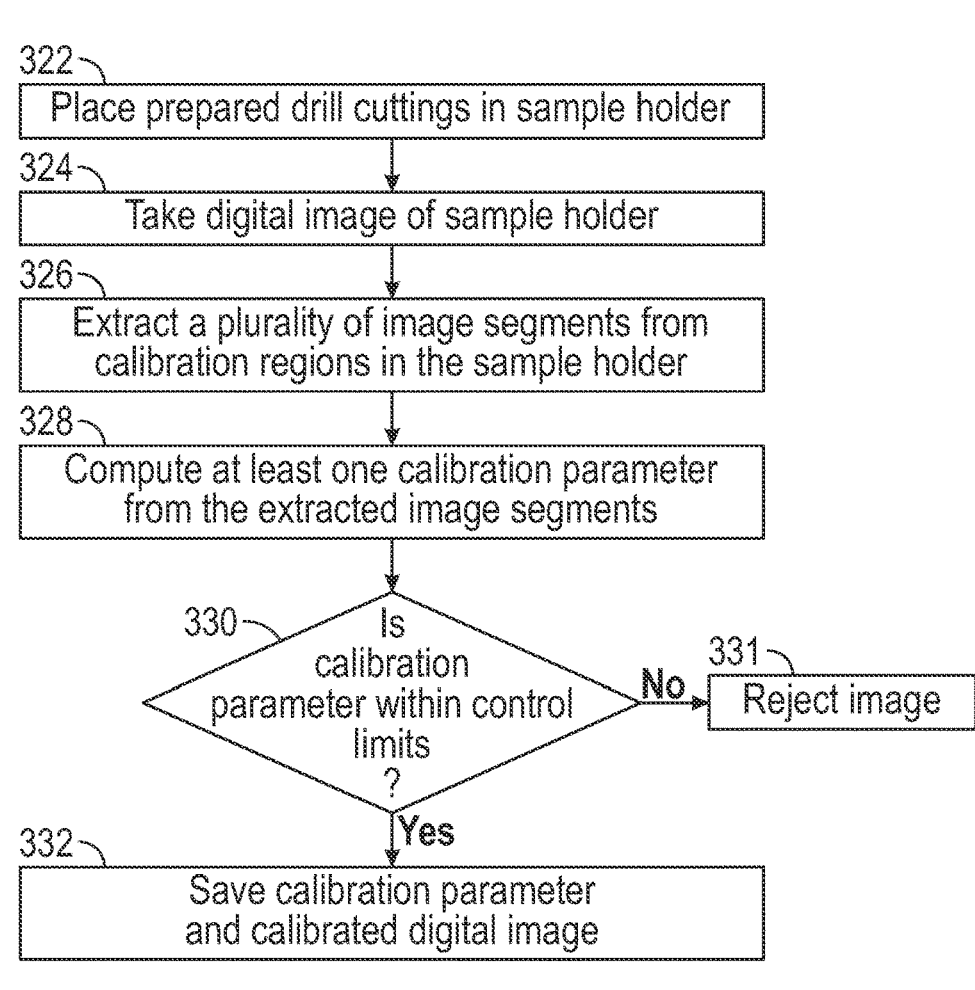

322 — Place prepared drill cuttings in sample holder

324 — Take digital image of sample holder

326 — Extract a plurality of image segments from calibration regions in the sample holder 328 — Compute at least one calibration parameter from the extracted image segments 330 — Is calibration parameter within control limits ?

No → 331 — Reject image

Yes

332 — Save calibration parameter and calibrated digital image

FIG. 7

SYSTEM, APPARATUS, AND METHOD FOR CONTINUOUS DIGITAL IMAGE CALIBRATION

CROSS REFERENCE TO RELATED APPLICATIONS

This application is a National Stage Entry of International Application No. PCT/US2024/030964, filed May 24, 2024, which claims the benefit of E.P. Provisional Application No. 23/305,837.9, entitled "SYSTEM, APPARATUS, AND METHOD FOR CONTINUOUS DIGITAL IMAGE CALIBRATION" filed May 26, 2023, the disclosure of which is hereby incorporated herein by reference.

BACKGROUND

In subterranean drilling operations, such as for oil and gas exploration and production, formation cuttings are generated by the drilling activity. These cuttings have long been evaluated and characterized to better understand the properties and structure of subsurface rock. The cuttings are commonly collected after passing the shale shakers, then cleaned and photographed for analysis. In recent years, there has been a desire to perform such evaluation and characterization automatically (or semi-automatically) to reduce human cost and shorten the turnaround time of the interpretation. However, implementing such automation is far from routine.

Automated image processing routines commonly extract detailed color, shape, size, and texture features from multiple individual particles in the image and therefore generally require robust image calibration to ensure particle to particle and image to image consistency. However, obtaining calibrated digital images of the drill cuttings can be difficult and time consuming. Moreover, changing rig conditions such as temperature and humidity, can cause calibration drift.

Known calibration procedures commonly include acquiring a digital image of a calibration target, such as a color checker, that includes various color regions to calibrate color contrast and lighting conditions and transition areas for measuring image sharpness to calibrate focus and other camera settings. While such calibration procedures may at times provide for an adequate calibration, they generally involve extensive manual interaction, are time consuming, and can be user dependent such that different operators may arrive at different system calibrations. There remains a need in the industry for improved digital image calibration procedures and more timely methods for obtaining calibrated digital images for use in automated machine learning algorithms to more provide for more accurate and consistent drill cuttings image evaluation.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 6 depicts an example method for acquiring a calibrated digital image of a drill cuttings sample.

FIG. 7 depicts a flow chart of another example method for acquiring a calibrated digital image of a drill cuttings sample.

DETAILED DESCRIPTION

Embodiments of the present disclosure include systems, apparatuses, and methods for acquiring a calibrated digital image of a drill cuttings sample. In one example embodiment, a disclosed system includes a digital camera deployed in an image acquisition chamber and configured to acquire a digital image of a cuttings sample. A calibration sample holder including a sample area configured to receive the drill cuttings sample and a calibration area having a color calibration region and a spatial resolution calibration region is deployed in the image acquisition chamber below the digital camera such that both the sample area and the calibration area are within a field of view of the digital camera. An electronic controller is configured to cause the digital camera to take a digital image of the calibration sample holder and evaluate a portion of the digital image including the calibration area to certify that the digital image meets or exceeds predetermined calibration standards.

Figure 1:
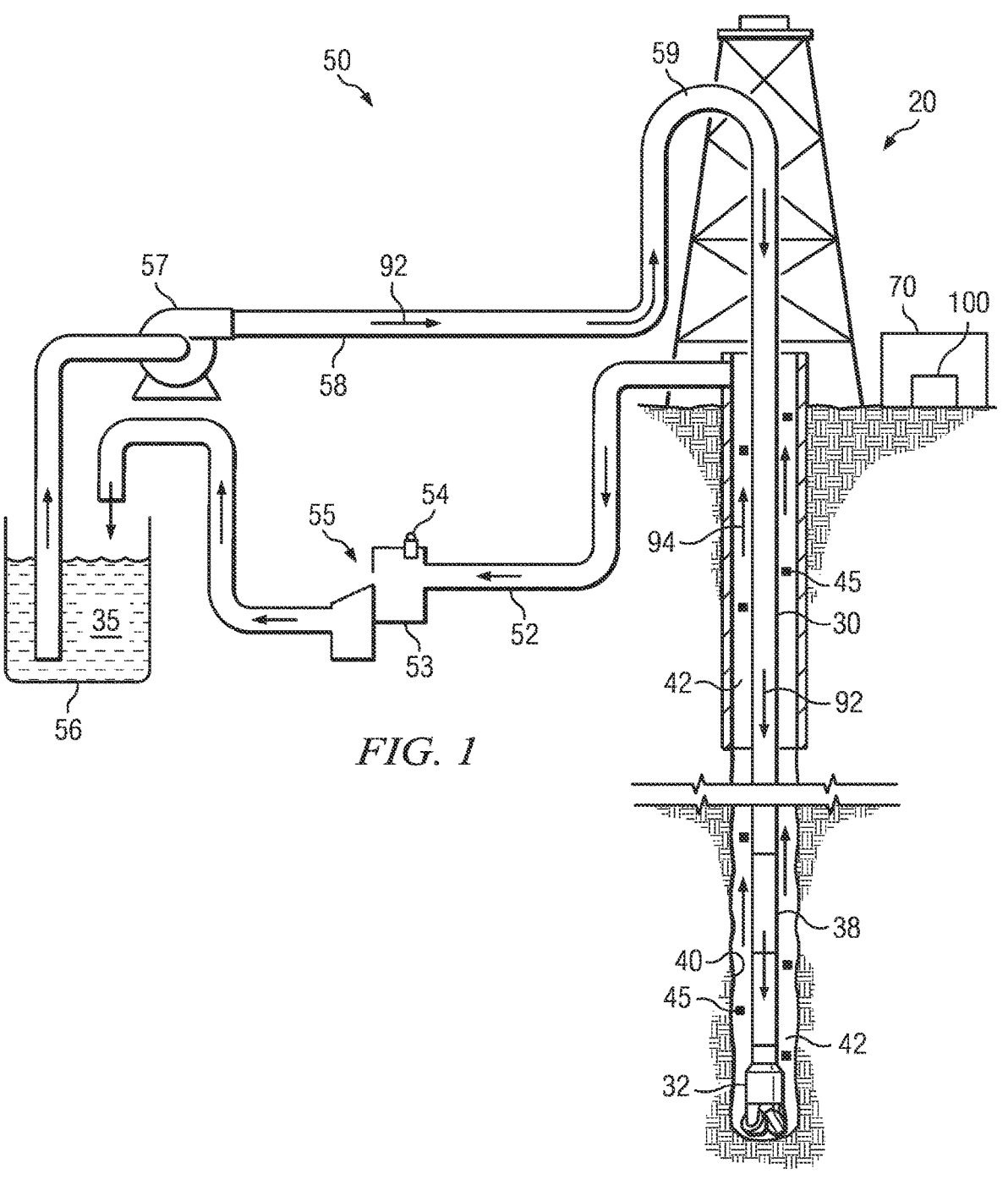
FIG. 1 depicts an example drilling rig including an example system for acquiring calibrated digital images of drill cuttings.

FIG. 1 depicts an example drilling rig 20 including a system 100 for acquiring a calibrated digital image of a drill cuttings sample. The drilling rig 20 may be positioned over a subterranean formation (not shown). The rig 20 may include, for example, a derrick and a hoisting apparatus (also not shown) for raising and lowering a drill string 30, which, as shown, extends into wellbore 40 and includes, for example, a drill bit 32 and one or more downhole measurement tools 38 (e.g., a logging while drilling tool or a measurement while drilling tool) in a bottom hole assembly (BHA) above the bit 32. Suitable drilling systems, for example, including drilling, steering, logging, and other downhole tools are well known in the art.

Drilling rig 20 further includes a surface system 50 for controlling the flow of drilling fluid used on the rig (e.g., used in drilling the wellbore 40). In the example rig depicted, drilling fluid 35 is pumped downhole (as depicted at 92), for example, via a conventional mud pump 57. The drilling fluid 35 may be pumped, for example, through a standpipe 58 and mud hose 59 in route to the drill string 30. The drilling fluid 35 typically emerges from the drill string 30 at or near the drill bit 32 and creates an upward flow 94 of mud through the wellbore annulus 42 (the annular space between the drill string and the wellbore wall). The drilling fluid 35 then flows through a return conduit 52 to a mud pit system 56 where may be recirculated. It will be appreciated that the terms drilling fluid and mud are used synonymously herein.

The circulating drilling fluid 35 is intended to perform many functions during a drilling operation, one of which is to carrying drill cuttings 45 to the surface (in upward flow 94). The drill cuttings 45 are commonly removed from the returning mud via a shale shaker 55 (or other similar solids control equipment) in the return conduit (e.g., immediately upstream of the mud pits 56). The drilling fluid 35 is generally reused and recirculated downhole. Formation gases that are released during drilling may also be carried to the surface in the circulating drilling fluid. These gasses are commonly removed from the fluid, for example, via a degasser or gas trap 54 located in or near a header tank 53 that is immediately upstream of the shale shaker 55 in the example depiction. The drill cuttings 45 and gas are commonly examined at the surface to evaluate the formation layers though which the wellbore is drilled.

The rig 20 may include a system 100 configured for acquiring a calibrated digital image of a drill cuttings sample as described in greater detail herein. The system 100 may be deployed at the rig site (e.g., in an onsite laboratory 70) or offsite. The disclosed embodiments are not limited in this regard. The system 100 may include computer hardware and software configured to acquire calibrated digital image of the drill cuttings sample. To perform these functions, the hardware may include one or more processors (e.g., microprocessors) which may be connected to one or more data storage devices (e.g., hard drives or solid state memory). As is known to those of ordinary skill, the processors may be further connected to a network, e.g., to receive the images from a networked camera system (not shown) or another computer system. It will, of course, be understood that the disclosed embodiments are not limited the use of or the configuration of any particular computer hardware and/or software.

While FIG. 1 depicts a land rig 20, it will be appreciated that the disclosed embodiments are equally well suited for land rigs or offshore rigs. As is known to those of ordinary skill, offshore rigs commonly include a platform deployed atop a riser that extends from the sea floor to the surface. The drill string extends downward from the platform, through the riser, and into the wellbore through a blowout preventer (BOP) located on the sea floor. The disclosed embodiments are not limited in these regards.

Figure 2:
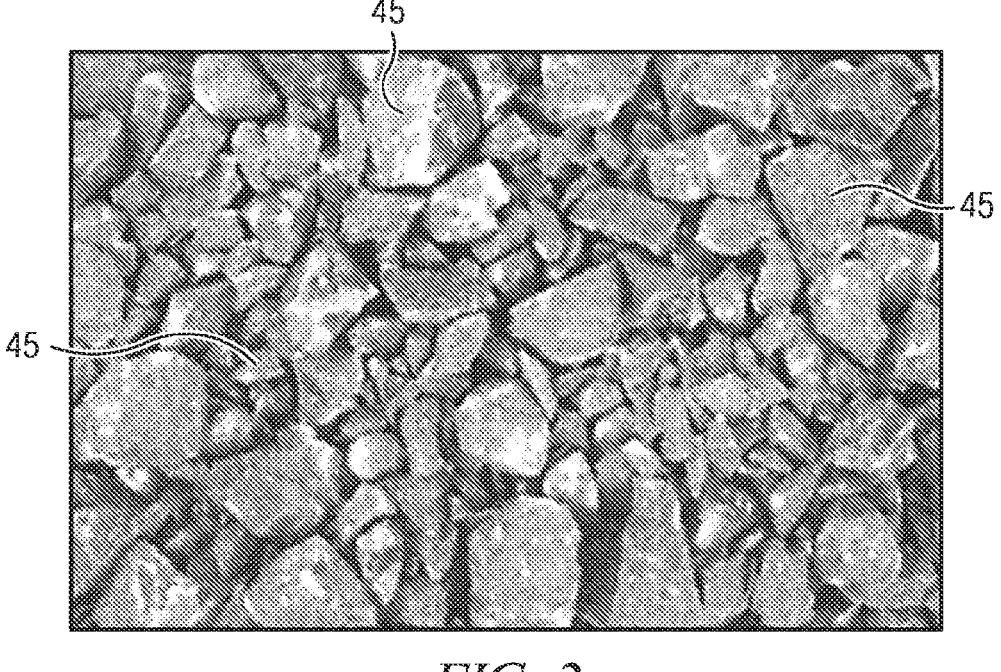
FIG. 2 depicts an example digital image of cuttings particles obtained during a downhole drilling operation.

FIG. 2 depicts an example digital image of cuttings particles obtained during a downhole drilling operation. The depicted image includes a large number of cuttings particles 45 placed on a tray. It has long been recognized that rock cuttings particles generated during drilling are abundant in volume and number and may potentially provide one of the lowest cost and most abundant data sources for understanding and characterizing the subsurface formation(s). In recent years there has been considerable interest in developing methods that make use of machine learning (e.g., artificial intelligence and neural network processing) to evaluate the cuttings particles (such as those depicted in FIG. 2).

For example, methods have been disclosed to classify formation lithology from digital images of cuttings particles. Such methods may include acquiring a calibrated digital image of the cuttings particles, segmenting the image to identify individual particles in the image, extracting geometry (e.g., size and shape), color, and/or texture features from the individual particles, and processing the extracted features to classify the lithology of the formation from which the cuttings were obtained.

It will be appreciated that segmentation and subsequent feature extraction may be highly influenced by the quality of the acquired digital image. For example, a blurry image or a shallow depth of field may significantly increase the difficulty in identifying individual particles during segmentation and/or extracting features from identified individual particles (particularly texture related features). Moreover, improper lighting (e.g., too much or too little light or improper lighting color) may reduce image contrast and may therefore also complicate segmentation and feature extraction. Inconsistent focus and lighting may also increase the difficulty of evaluating (or correlating) the extracted features with particular formation properties or classifications.

Figure 3A:
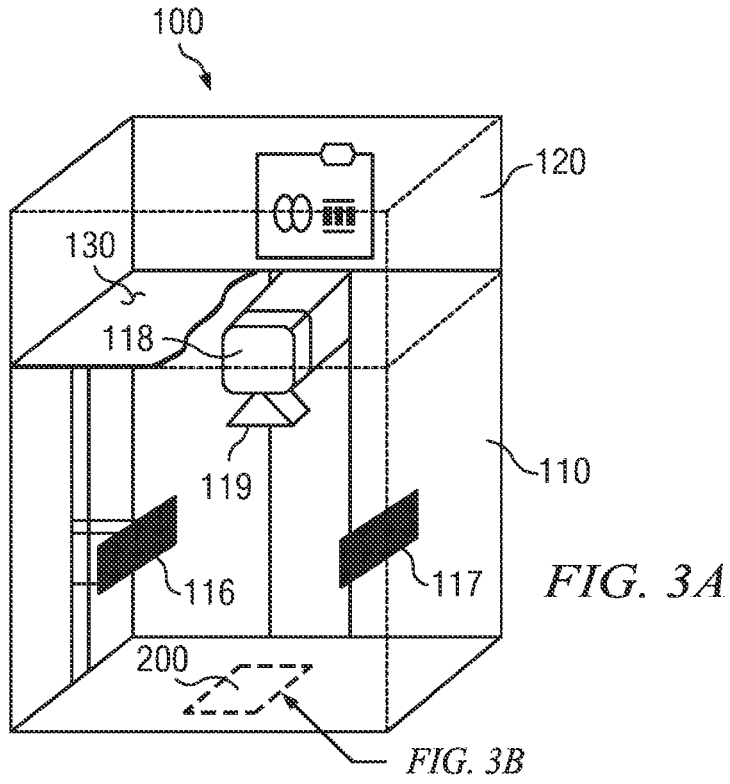
FIGS. 3A and 3B (collectively FIG. 3) depict an image acquisition system (3A) including a disclosed calibration sample holder (3B).
Figure 3B:
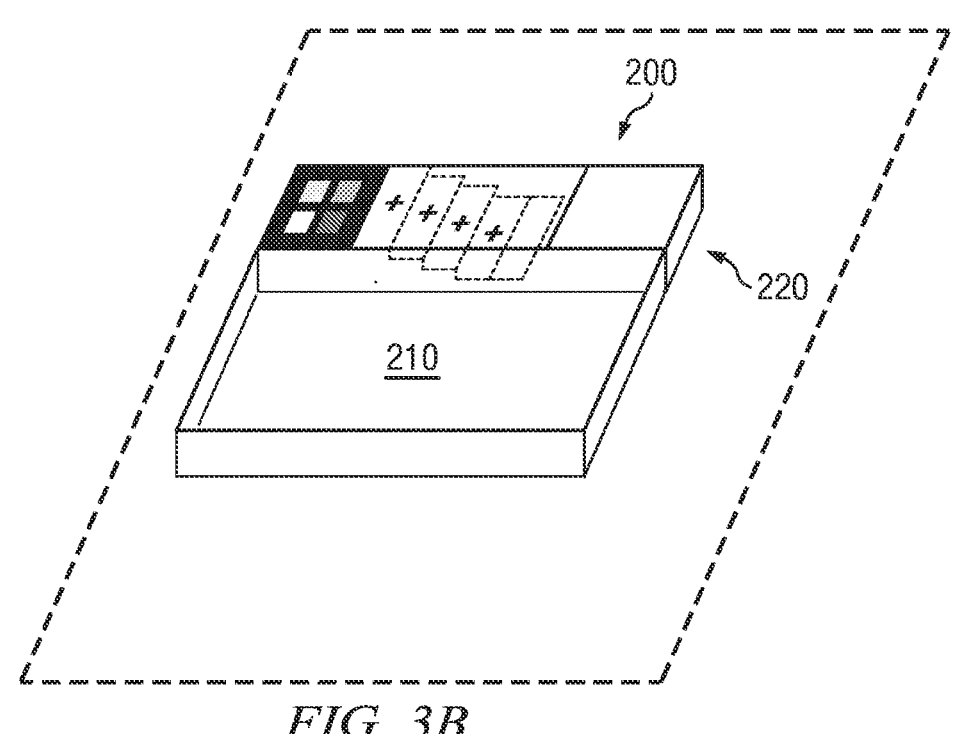

FIGS. 3A and 3B (collectively FIG. 3) depict an image acquisition system 100 (also referred to herein as image acquisition device 100) including a disclosed continuous calibration sample holder 200 (also referred to herein as a sample holder 200). In example embodiments, for example as shown on FIG. 3A, the device 100 may be a portable instrument and may be configured for use at substantially any suitable location at a rig site (e.g., in a rig laboratory 70 or adjacent the shale shaker 55 or other surface system or rig components). The depicted example includes first and second chambers 110, 120, including a lower image acquisition chamber 110 and an upper service chamber 120. The image acquisition chamber 110 may include one or more light sources, for example, including a white light source 116 and/or an ultraviolet light source 117 configured to illuminate the sample holder 200 (which is described in more detail below). The chamber 110 may further include a camera 118 and a corresponding lens 119 deployed above the sample holder 200, for example, mounted on or in a divider 130 disposed between the upper and lower chambers 120, 110.

As shown on FIG. 3B, the sample holder 200 may include a sample area 210 and a calibration or quality control (QC) area 220. As described in more detail below, the calibration area 220 may include a plurality of calibration features that enable the calibration of system 100 to be evaluated or even automatically updated on an image by image basis. The sample holder 200 may be disposed with respect to the camera such that the sample area 210 and the calibration area 220 substantially fill the field of view of the camera. In one non-limiting example embodiment, the digital camera 118 may include an 18 megapixel sensor. In such an example embodiment, the sample area 210 and the calibration area 220 may be sized and shaped such that the sample area 210 occupies a 4912×2762 pixel area and the calibration area 220 occupies a 4912×922 pixel area when the sample holder 200 completely fills the field of view of the sensor. The disclosed embodiments are, of course, not limited to any particular sensor resolution or any particular sizes or ratio of sizes of the sample area and calibration area.

While not depicted on FIG. 3, it will be understood that the image acquisition system 100 may further include an electronic controller deployed in the upper chamber 120. The controller may include, for example, a computer board (or motherboard) configured to control operation of the camera 118, the lens 119, and/or the lights 116, 117. The controller 124 may include one or more processors (e.g., microprocessors) which may be connected to one or more data storage devices (e.g., hard drives or solid state memory). The controller may be configured to network (e.g., communicate) with external devices, for example, via a hard wire or wireless connection. For example, the controller 124 may be configured to upload acquired images to a local (rig-site) computer and/or to a cloud based computing system. The controller 124 may further include processor executable instructions stored in memory. As described in more detail below with respect to FIGS. 6, 7, and 8, the instructions may be configured to cause the device 100 to automatically calibrate the image acquisition system, acquire at least one cuttings image, to process the image, and/or to upload the image to an external computer system.

Figures 4A, 4B:
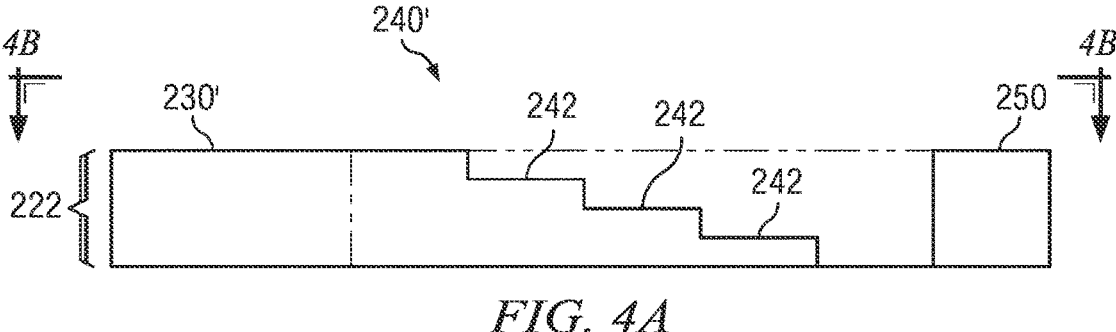
FIGS. 4A and 4B (collectively FIG. 4) depicts one example calibration sample holder.

Turning now to FIGS. 4A and 4B (collectively FIG. 4), one example continuous calibration sample holder 200' is shown in more detail. In the depicted example embodiment, the sample area 210 may include a sample tray configured to receive the drill cuttings (e.g., a washed and screened sample of drill cuttings particles). The sample area 210 may include substantially any suitable tray, for example, including a plastic or metal tray having a high contrast (vivid) background color (such as red or magenta) to enhance later particle identification and segmentation in the acquired images. The tray may be sized and shaped (in coordination with the camera lens system) to hold a sufficient quantity of the drill cuttings and to fill the field of view of the camera lens system (along with the corresponding calibration area 220').

In the example embodiment depicted, the calibration area 220' is at least partially raised with respect to (disposed above) the sample area 210. For example, the calibration area 220' may be raised above the sample area 210 by a step height 222 that is similar to an approximate or average particle size of the drill cuttings, which may be about 2 mm in one example embodiment (e.g., in a range from 1 mm 5 mm or in a range from 1 mm to 3 mm). The disclosed embodiments are, of course, not limited to any particular step height or step heights. The calibration area 220' may include a plurality of calibration regions, for example, including a color calibration region 230' and a spatial resolution calibration region 240'. The calibration area 220' may further optionally include a company logo or trademark region 250 (e.g., including a trademark or other marketing indicia or markings).

A color calibration region 230' may advantageously include a plurality of colored features, for example, including red 232R, green 233G, blue 234B, and white 235W square features in a black background 236 in the depicted example. In such an embodiment, the red, green, blue, and white features may be selected such that they are (or are close to) pure red, pure green, pure blue, and pure white such that they may be interpreted as binary colors (e.g., in which red is (1,0,0), green is (0,1,0), blue is (0,0,1) and white is (1,1,1)). The black background may also be selected to be pure (or close to) pure black (0,0,0).

The spatial resolution calibration region 240' may include at least one spatial resolution calibration feature such as a straight or slanted edge, a wedge, or other sharp feature such as indicia (e.g., a "+" or a "/" sign) or other markings for evaluating the spatial resolution of the image acquisition system 100. In certain advantageous embodiments the spatial resolution calibration region 240' may include a plurality of spatial resolution calibration features disposed at a corresponding plurality of step heights above the sample area 210. One or more of the spatial resolution calibration features may be disposed on corresponding steps 242 that are raised up (stepped up) from the sample area 210 (these steps 242 may also be understood to be stepped down from the color calibration region 230'). Evaluation of the spatial resolution of the device 100 at each of these features may advantageously enable a depth of field of the imaging system 100 to be determined.

With continued reference to FIG. 4, the depicted example includes five slanted edges 244A, 244B, 244C, 244D, and 244E disposed at corresponding distinct step heights in the spatial resolution calibration region 240'. In this example embodiment, slanted edge 244A is disposed at the same height as the color calibration region 230' (e.g., at a height of 2 mm above the sample area 210), while slanted edge 244E is disposed at the same height as the sample area 210.

Slanted edges 244B, 244C, and 244D are disposed on first, second, and third steps 242 (e.g., at 1.5 mm, 1.0 mm and 0.5 mm above the sample area 210). It will be appreciated that the disclosed embodiments are not limited by the detailed embodiment depicted on FIG. 4 including four colored squares and five slanted edges. Nor are the disclosed embodiments limited to any particular number of steps or to any particular spatial resolution features disposed thereon.

Figure 5:
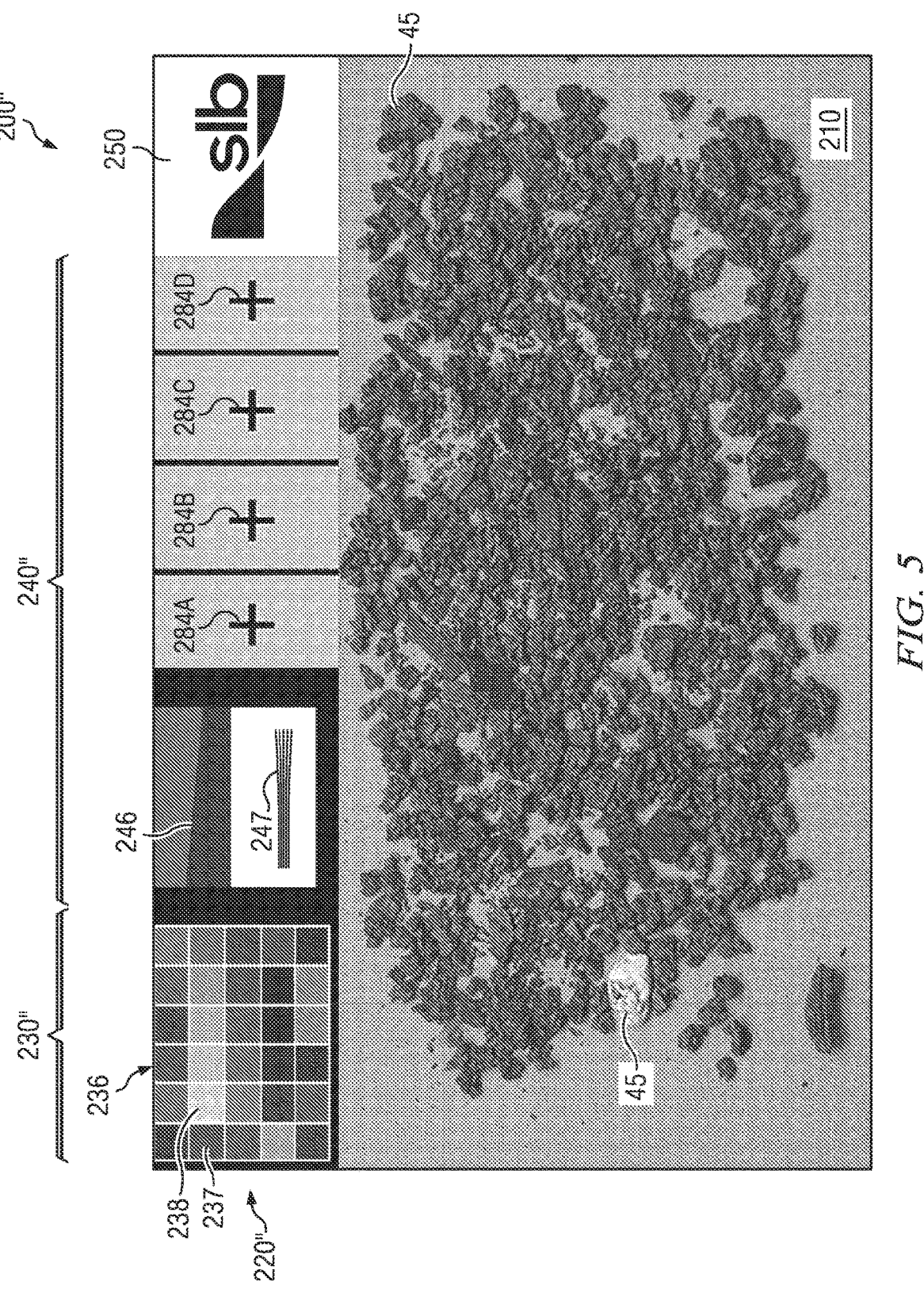
FIG. 5 depicts another example calibration sample holder.

FIG. 5 depicts another example calibration sample holder 200". Sample holder 200" is similar to sample holder 200' (FIG. 4) in that it includes a sample area 210 and a calibration or QC area 220". The sample area 210 may include a sample tray configured to receive the drill cuttings 45, for example, including a plastic or metal tray having a high contrast (vivid) background color as described above. The calibration area 220" may be raised above the sample area, for example, as also described above, and may include a plurality of calibration regions such as a color calibration region 230" and a spatial resolution calibration region 240".

With continued reference to FIG. 5, the example color calibration region 230" may include a 6×5 grid 236 of colored and grey squares in which the colored squares occupy the periphery 237 of the grid and the grey squares occupy the interior 238 of the grid. The colored and grey squares may be taken (and rearranged), for example, from the commercially available Rez Checker target available from Imatest or the MacBeth color checker. In such an embodiment, the grid 236 may include 18 colored squares disposed around the periphery 237 and 12 grey scale squares in the interior 238 (3×4 region) of the grid. It will be understood that in FIG. 5, both the colored calibration squares and the grey scale squares are shown in grey scale for ease of illustration.

The example spatial resolution calibration region 240" depicted in FIG. 5 includes a slanted edge 246 and a wedge 247 disposed at the same height as the color calibration region 230". The spatial resolution calibration region 240" further includes four plus "+" symbols 248A, 248B, 248C, 248D disposed on corresponding steps (step heights) below the color calibration region 230". In the example embodiment depicted, the "+" symbols 248A, 248B, are 248C are disposed on first, second, and third steps down from the color calibration region 230" (e.g., 1.5 mm, 1.0 mm and 0.5 mm above the sample area 210), while symbol 248D is disposed at the same height as the sample area 210.

It will be appreciated that the sample holders 200' and 200" shown on FIGS. 4 and 5 are merely examples. The disclosed embodiments are not limited to the particular calibration areas 220' and 220" depicted. For example, the disclosed embodiments are not limited to a calibration area including a spatial resolution calibration region having multiple steps or step heights. In other example embodiments, a spatial calibration region may include one or more spatial resolution calibration feature disposed at only one level. In another example embodiment, a spatial calibration region may include an inclined plane having a known slope. A slanted edge or wedge may be disposed along the slope and thereby enable a depth of field to be determined by evaluating the spatial resolution of the edge or wedge at a plurality of positions along the incline (and therefore heights above the sample area).

Turning now to FIG. 6, an example method 300 for obtaining a calibrated digital image of a drill cuttings sample is depicted. A borehole is drilled at 302, for example, using the rig equipment described above with respect to FIG. 1. The drilling operation generates cuttings that are collected at 304, for example, from a shale shaker 55, as also described with respect to FIG. 1. In example embodiments, the cuttings may be prepared for analysis at 306, for example, by washing in water or other solvents, drying in an oven, and/or sieving or meshing the cuttings (e.g., as shown at 90) to remove large or small particles. A sample of the prepared cuttings may then be placed on the sample area of a sample holders 200, 200', 200'' (FIGS. 3-5) in the image acquisition device 100. A calibrated digital image may be manually or automatically acquired at 308.

FIG. 7 depicts a flow chart of another example method 320 for acquiring a calibrated digital image of a drill cuttings sample. A sample of prepared drill cuttings is placed on a calibration sample holder in an image acquisition device at 322. As described above, the calibration sample holder includes a sample area and a calibration area in the field of view of a digital camera in the image acquisition device. A digital image is taken at 324, for example, including one or more of a white light image, an infrared image, and an ultraviolet image of the sample area (including the cuttings) and the calibration area. A plurality of image segments (or blocks) is extracted from corresponding calibration regions within the calibration area at 326. The calibration regions are generally predefined and correspond to known spatial resolution, color, and/or greyscale features in the calibration area (e.g., as described above with respect to FIGS. 4 and 5).

With continued reference to FIG. 7, the extracted image segments may be evaluated at 328 to compute at least one calibration parameter, for example, including at least two calibration parameters including at least one spatial frequency parameter and at least one color or brightness parameter. For example, the spatial frequency parameter may include the modulation transfer function 50% (MTF50), which is a measure of the spatial frequency response of an imaging system and is an indicator of image sharpness. An example brightness parameter may include the saturation of the colored features and/or the greyscale features. An example color parameter may include the Delta E (e.g., a Delta E00) of the colored image segments (it will be appreciated that Delta E is a standard measure of the difference between displayed colors). The computed calibration parameter(s) (e.g., including the MTF50, Delta E00, and/or the saturation) may be compared with corresponding threshold values (or control limits) at 330 to determine whether or not the system calibration is within specification. The computed calibration parameter(s) and the comparison with the control limits may be saved with the digital image at 332, thereby certifying the calibration of the digital image. It will be appreciated that method 320 may be thought of as providing a real time (image by image) continuous verification of the system (and therefore image) calibration.

Figure 8:
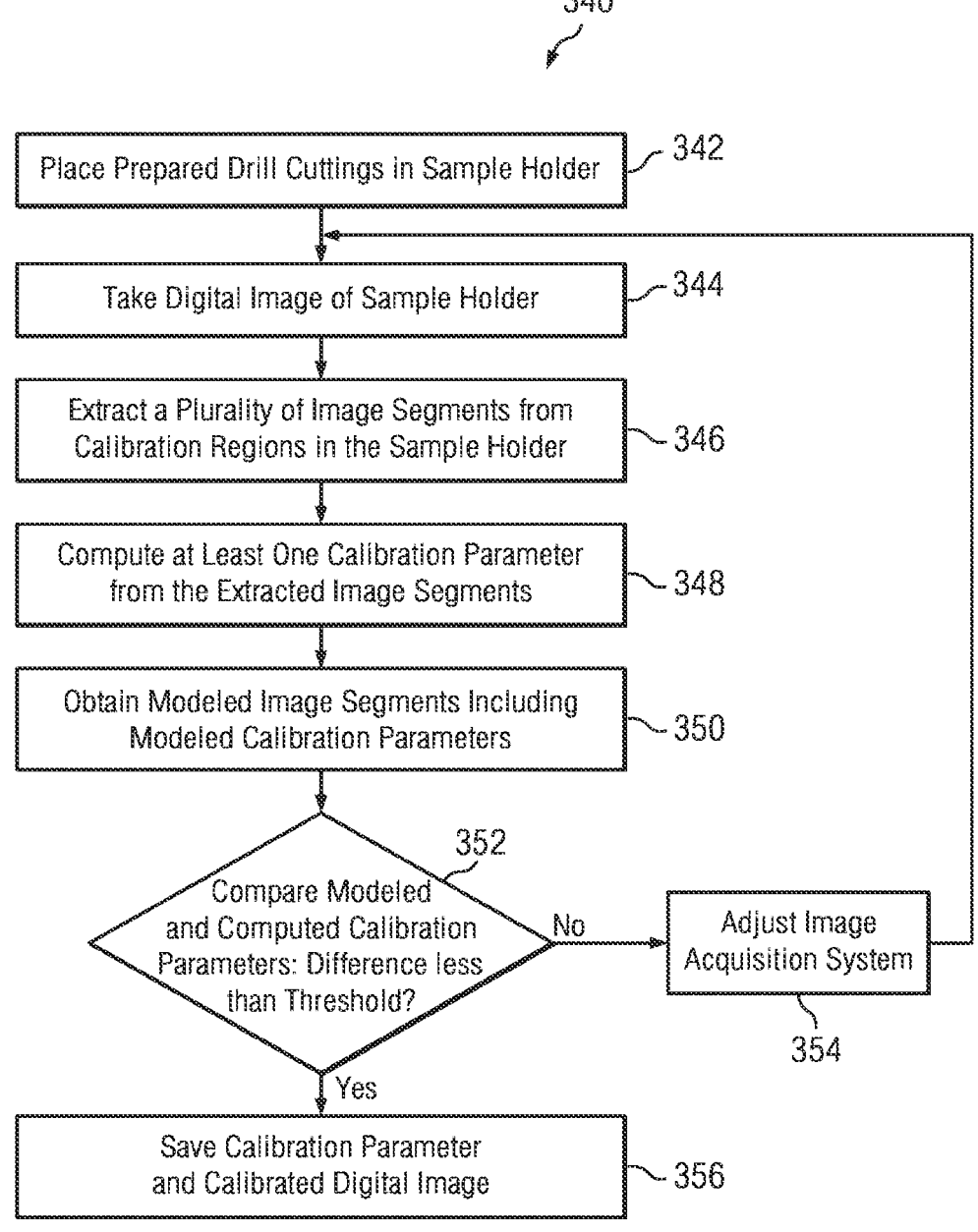
FIG. 8 depicts a flow chart of still another example method for acquiring a calibrated digital image of a drill cuttings sample.

FIG. 8 depicts a flow chart of still another example method 340 for acquiring a calibrated digital image of a drill cuttings. Method 340 is similar to method 320 (FIG. 7) in that a sample of prepared drill cuttings is placed on a calibration sample holder at 342, a digital image is taken at 344 including an image of both the drill cuttings sample and the calibration area, and a plurality of image segments is extracted from corresponding calibration regions within the calibration area at 346. The extracted image segments may be evaluated at 348 to compute at least one calibration parameter, for example, including at least one spatial frequency parameter and at least one color or brightness parameter.

Modeled (synthetic) image segments including modeled calibration parameters are obtained (or computed) at 350 for the corresponding region(s) of the calibration area. The modeled image segments may be obtained using substantially any suitable techniques depending on characteristics of the segments and may be stored in memory in the image acquisition device 100. The modeled segments may include reference colors (e.g., including reference red, green, and blue values) corresponding to particular ones of the calibration regions, reference intensities (or shades of grey) corresponding to other ones of the calibration regions, and/or modeled edge or wedge images corresponding to still other calibration regions in the calibration target.

With continued reference to FIG. 8, method 340 further includes comparing the computed calibration parameters and the modeled calibration parameters at 352. When a difference (or differences) between the computed calibration parameters and the modeled calibration parameters is/are less than the threshold. For example, when the computed saturation, Delta E00, and the MTF50 of the extracted segments are within threshold (specification) limits of the modeled saturation, Delta E00, and the MTF50, the image is considered to be calibrated. When the difference (or differences) between the computed calibration parameters and the modeled calibration parameters is/are greater than the threshold, the image acquisition system is adjusted at 354. The method may then then return to 344 and the acquisition of another digital image of the drill cuttings and the calibration area.

The adjustment(s) to the image acquisition system at 354 may advantageously include updates to camera settings such as the exposure time and RGB gains, however, the disclosed embodiments are not limited in this regard as other adjustments may include, for example, lens settings such as focus and aperture and light intensity, temperature, spectrum, and power adjustments. Camera and lighting settings, in particular, may be advantageously automatically adjusted such that certain advantageous embodiments of method 340 may include a fully automated continuous calibration method. It will be appreciated that method 340 may be thought of as providing a real time (image by image) continuous calibration of the image acquisition system such that the calibration of each digital image is ensured.

With still further reference to FIG. 8, comparing the extracted and modeled image segments at 350 may include comparing a single (unitary) extracted image segment and a corresponding single (unitary) modeled image segment or may include comparing a plurality of extracted image segments (e.g., of a plurality of calibration regions) with a corresponding plurality of modeled images. For example, image segments of each of a plurality of colored calibration regions may be compared with corresponding modeled images of each of the same colored calibration regions. In such an embodiment, the comparison may include computing a sum (or weighted sum) of the differences between the acquired image segments and the modeled image segments and comparing the result with a corresponding threshold. In another embodiment, image segments of a plurality of grey calibration regions may be compared with corresponding modeled image segments of each of the same grey scale calibration regions. In still another embodiment, one or more image segments of edge or wedge regions may be compared with corresponding modeled images to compute a spatial resolution of the image acquisition system which may then be compared with a corresponding threshold.

With continued reference to FIGS. 7 and 8, the system calibration may further include calibrating a field of view of the image acquisition system. For example, in sample holder embodiments including a plurality of spatial resolution features disposed at a corresponding plurality of steps heights, an MTF50 may be computed for each of the spatial resolution features (e.g., for each of a plurality of slanted edges as shown on FIG. 4). The system may be confirmed or verified to have a calibrated depth of field when each of the MTF50 values exceeds a predetermined threshold. In certain example embodiments, the system may be further confirmed or verified to have a calibrated depth of field when a ratio between the minimum MTF50 value and the maximum MTF50 value exceeds a threshold (e.g., 50% or 75%).

It will be understood that the present disclosure includes numerous embodiments. These embodiments include, but are not limited to, the following embodiments.

In a first embodiment, a system for acquiring a calibrated digital image of a drill cuttings sample includes a digital camera deployed in an image acquisition chamber and configured to acquire a digital image of a cuttings sample; a calibration sample holder including a sample area configured to receive the drill cuttings sample and a calibration area having a color calibration region and a spatial resolution calibration region, the calibration sample holder deployed below the digital camera such that both the sample area and the calibration area are within a field of view of the digital camera; and an electronic controller configured to cause the digital camera to take a digital image of the calibration sample holder and evaluate a portion of the digital image including the calibration area to certify that the digital image meets or exceeds predetermined calibration standards.

A second embodiment may include the first embodiment, wherein the color calibration region comprises a plurality of colored features.

A third embodiment may include any one of the first through second embodiments, wherein the color calibration region comprises a plurality of grey scale features.

A fourth embodiment may include any one of the first through third embodiments, wherein the spatial resolution calibration region comprises a spatial resolution feature including at least one edge or wedge feature.

A fifth embodiment may include any one of the first through fourth embodiments, wherein the spatial resolution calibration region comprises at least first, second, and third spatial resolution features; the first spatial resolution feature is disposed on a first surface that is raised above the sample area by a first height; the second spatial resolution feature is disposed on a second surface that is level with the sample area; and the third spatial resolution feature is disposed on a third surface that is raised above the sample area by a second height, wherein the second height is less than the first height.

A sixth embodiment may include any one of the first through fifth embodiments, wherein the color calibration region comprises a plurality of colored features disposed on a first surface that is raised above the sample area by a first height; the spatial resolution calibration region comprises at least first, second, and third spatial resolution features; the first spatial resolution feature is disposed on the first surface; the second spatial resolution feature is disposed on a second surface that is level with the sample area; and the third spatial resolution feature is disposed on a third surface that is raised above the sample area by a second height, wherein the second height is less than the first height.

A seventh embodiment may include the sixth embodiment, wherein the first height is in a range from 1 mm to 3 mm.

An eighth embodiment may include any one of the first through seventh embodiments, wherein the controller is further configured to extract a plurality of image segments from the portion of the digital image including the calibration area; evaluate the extracted segments to compute a plurality of calibration parameters; compare the plurality of calibration parameters with corresponding quality control calibration specifications; and certify that the digital image meets or exceeds the predetermined calibration standards when each of the plurality of calibration parameters is within threshold limits of the corresponding quality control calibration specifications.

A ninth embodiment may include the eighth embodiment, wherein the plurality of calibration parameters comprises at least two of a saturation, a Delta E, and an MTF50.

A tenth embodiment may include any one of the eighth through ninth embodiments, wherein the controller is further configured to automatically adjust at least one camera setting, lens setting, or lighting setting in the system and to cause the digital camera to take another digital image of the calibration sample holder.

In an eleventh embodiment, a method for acquiring a calibrated digital image of a drill cuttings sample includes placing a drill cuttings sample in a calibration sample holder in an image acquisition device, the calibration sample holder including a sample area and a calibration area disposed in a field of view of a digital camera in the in the image acquisition device, the drill cuttings sample placed in the sample area; taking a digital image of the calibration sample holder with the digital camera; extracting a plurality of image segments from a portion of the digital image including the calibration area; evaluating the extracted segments to compute a plurality of calibration parameters; comparing the plurality of calibration parameters with corresponding quality control calibration specifications; and certifying that the digital image meets or exceeds the predetermined calibration standards when the plurality of calibration parameters are within threshold limits of the corresponding quality control calibration specifications.

A twelfth embodiment may include the eleventh embodiment, wherein the calibration area comprises a color calibration area including a plurality of color features and a spatial resolution calibration area including at least one spatial resolution feature.

A thirteenth embodiment may include the twelfth embodiment, wherein the color calibration region comprises a plurality of colored features disposed on a first surface that is raised above the sample area by a first height; the spatial resolution calibration region comprises at least first, second, and third spatial resolution features; the first spatial resolution feature is disposed on the first surface; the second spatial resolution feature is disposed on a second surface that is level with the sample area; and the third spatial resolution feature is disposed on a third surface that is raised above the sample area by a second height, wherein the second height is less than the first height.

A fourteenth embodiment may include any one of the eleventh through thirteenth embodiments, wherein the plurality of calibration parameters comprises at least two of a saturation, a Delta E, and an MTF50.

A fifteenth embodiment may include any one of the eleventh through fourteenth embodiments, further comprising automatically adjusting at least one setting on the digital camera, on a lens, or on a light in the image acquisition device; and taking another digital image of the calibration sample holder with the digital camera.

In a sixteenth embodiment, a sample holder for a drill cuttings sample includes a sample area configured to receive the drill cuttings sample; and a calibration area having a color calibration region including a plurality of color features and a spatial resolution calibration region including a least one spatial resolution calibration feature; wherein the sample holder is configured for deployment in an image acquisition device below a digital camera such that both the sample area and the calibration area are within a field of view of the digital camera.

A seventeenth embodiment may include the sixteenth embodiment, wherein the color calibration region comprises a plurality of colored features disposed on a surface that is raised above the sample area.

An eighteenth embodiment may include any one of the sixteenth through seventeenth embodiments, wherein the spatial resolution calibration region comprises at least first, second, and third spatial resolution features; the first spatial resolution feature is disposed on a first surface that is raised above the sample area by a first height; the second spatial resolution feature is disposed on a second surface that is level with the sample area; and the third spatial resolution feature is disposed on a third surface that is raised above the sample area by a second height, wherein the second height is less than the first height.

A nineteenth embodiment may include any one of the sixteenth through eighteenth embodiments, wherein the color calibration region comprises a plurality of colored features disposed on a first surface that is raised above the sample area by a first height; the spatial resolution calibration region comprises at least first, second, and third spatial resolution features; the first spatial resolution feature is disposed on the first surface; the second spatial resolution feature is disposed on a second surface that is level with the sample area; and the third spatial resolution feature is disposed on a third surface that is raised above the sample area by a second height, wherein the second height is less than the first height.

A twentieth embodiment may include the nineteenth embodiment, wherein the first height is in a range from 1 mm to 3 mm.

Although a system, apparatus, and method for continuous digital image calibration has been described in detail, it should be understood that various changes, substitutions and alternations can be made herein without departing from the spirit and scope of the disclosure as defined by the appended claims.

What is claimed is:

1. A system for acquiring a calibrated digital image of a drill cuttings sample; the system comprising:
   a digital camera deployed in an image acquisition chamber and configured to acquire a digital image of a cuttings sample;
   a calibration sample holder including a sample area configured to receive the drill cuttings sample and a calibration area having a color calibration region and a spatial resolution calibration region, the calibration sample holder deployed below the digital camera such that both the sample area and the calibration area are within a field of view of the digital camera; and
   an electronic controller configured to cause the digital camera to take a digital image of the calibration sample holder and evaluate a portion of the digital image including the calibration area to certify that the digital image meets or exceeds predetermined calibration standards.

2. The system of claim 1, wherein the color calibration region comprises a plurality of colored features.

3. The system of claim 1, wherein the color calibration region comprises a plurality of grey scale features.

4. The system of claim 1, wherein the spatial resolution calibration region comprises a spatial resolution feature including at least one edge or wedge feature.

5. The system of claim 1, wherein:
   the spatial resolution calibration region comprises at least first, second, and third spatial resolution features;
   the first spatial resolution feature is disposed on a first surface that is raised above the sample area by a first height;
   the second spatial resolution feature is disposed on a second surface that is level with the sample area; and
   the third spatial resolution feature is disposed on a third surface that is raised above the sample area by a second height, wherein the second height is less than the first height.

6. The system of claim 1, wherein:
   the color calibration region comprises a plurality of colored features disposed on a first surface that is raised above the sample area by a first height;
   the spatial resolution calibration region comprises at least first, second, and third spatial resolution features;
   the first spatial resolution feature is disposed on the first surface;
   the second spatial resolution feature is disposed on a second surface that is level with the sample area; and
   the third spatial resolution feature is disposed on a third surface that is raised above the sample area by a second height, wherein the second height is less than the first height.

7. The system of claim 6, wherein the first height is in a range from 1 mm to 3 mm.

8. The system of claim 1, wherein the controller is further configured to:
   extract a plurality of image segments from the portion of the digital image including the calibration area;
   evaluate the extracted segments to compute a plurality of calibration parameters;
   compare the plurality of calibration parameters with corresponding quality control calibration specifications; and
   certify that the digital image meets or exceeds the predetermined calibration standards when each of the plurality of calibration parameters is within threshold limits of the corresponding quality control calibration specifications.

9. The system of claim 8, wherein the plurality of calibration parameters comprises at least two of a saturation, a Delta E, and an MTF50.

10. The system of claim 8, wherein the controller is further configured to automatically adjust at least one camera setting, lens setting, or lighting setting in the system and to cause the digital camera to take another digital image of the calibration sample holder.

11. A method for acquiring a calibrated digital image of a drill cuttings sample, the method comprising:
   placing a drill cuttings sample in a calibration sample holder in an image acquisition device, the calibration sample holder including a sample area and a calibration area disposed in a field of view of a digital camera in the in the image acquisition device, the drill cuttings sample placed in the sample area;
   taking a digital image of the calibration sample holder with the digital camera;
   extracting a plurality of image segments from a portion of the digital image including the calibration area;
   evaluating the extracted segments to compute a plurality of calibration parameters;

comparing the plurality of calibration parameters with corresponding quality control calibration specifications; and certifying that the digital image meets or exceeds the predetermined calibration standards when the plurality of calibration parameters are within threshold limits of the corresponding quality control calibration specifications.

12. The method of claim 11, wherein the calibration area comprises a color calibration area including a plurality of color features and a spatial resolution calibration area including at least one spatial resolution feature.

13. The method of claim 12, wherein:

the color calibration region comprises a plurality of colored features disposed on a first surface that is raised above the sample area by a first height;

the spatial resolution calibration region comprises at least first, second, and third spatial resolution features;

the first spatial resolution feature is disposed on the first surface;

the second spatial resolution feature is disposed on a second surface that is level with the sample area; and the third spatial resolution feature is disposed on a third surface that is raised above the sample area by a second height, wherein the second height is less than the first height.

14. The method of claim 11, wherein the plurality of calibration parameters comprises at least two of a saturation, a Delta E, and an MTF50.

15. The method of claim 11, further comprising:

automatically adjusting at least one setting on the digital camera, on a lens, or on a light in the image acquisition device; and taking another digital image of the calibration sample holder with the digital camera.

16. A sample holder for a drill cuttings sample, the sample holder comprising:

a sample area configured to receive the drill cuttings sample; and a calibration area having a color calibration region including a plurality of color features and a spatial resolution calibration region including a least one spatial resolution calibration feature;

wherein the sample holder is configured for deployment in an image acquisition device below a digital camera such that both the sample area and the calibration area are within a field of view of the digital camera.

17. The sample holder of claim 16, wherein the color calibration region comprises a plurality of colored features disposed on a surface that is raised above the sample area.

18. The sample holder of claim 16, wherein:

the spatial resolution calibration region comprises at least first, second, and third spatial resolution features;

the first spatial resolution feature is disposed on a first surface that is raised above the sample area by a first height;

the second spatial resolution feature is disposed on a second surface that is level with the sample area; and the third spatial resolution feature is disposed on a third surface that is raised above the sample area by a second height, wherein the second height is less than the first height.

19. The sample holder of claim 16, wherein:

the color calibration region comprises a plurality of colored features disposed on a first surface that is raised above the sample area by a first height;

the spatial resolution calibration region comprises at least first, second, and third spatial resolution features;

the first spatial resolution feature is disposed on the first surface;

the second spatial resolution feature is disposed on a second surface that is level with the sample area; and the third spatial resolution feature is disposed on a third surface that is raised above the sample area by a second height, wherein the second height is less than the first height.

20. The sample holder of claim 19, wherein the first height is in a range from 1 mm to 3 mm.

* * * * *